US010604216B2

(12) United States Patent
Schinkel et al.

(10) Patent No.: US 10,604,216 B2
(45) Date of Patent: Mar. 31, 2020

(54) MOTION COMPENSATION DEVICE

(71) Applicant: Ampelmann Holding B.V., Delft (NL)

(72) Inventors: Michael Hubert Schinkel, Utrecht (NL); Edouard Frans Alexander Schinkel, Utrecht (NL)

(73) Assignee: AMPELMANN HOLDING B.V., Delft (NL)

( * ) Notice: Subject to any disclaimer, the term of this patent is extended or adjusted under 35 U.S.C. 154(b) by 0 days.

(21) Appl. No.: 15/614,217

(22) Filed: Jun. 5, 2017

(65) Prior Publication Data

US 2017/0305507 A1 Oct. 26, 2017

Related U.S. Application Data

(63) Continuation of application No. PCT/NL2015/050838, filed on Dec. 3, 2015.

(30) Foreign Application Priority Data

Dec. 5, 2014 (NL) .................................... 2013933
Apr. 14, 2015 (NL) .................................... 2014631

(51) Int. Cl.
*B25H 1/00* (2006.01)
*B66C 13/02* (2006.01)
(Continued)

(52) U.S. Cl.
CPC .............. *B63B 27/30* (2013.01); *B63B 27/10* (2013.01); *B63B 27/14* (2013.01); *B25H 1/0028* (2013.01); *B63B 2017/0072* (2013.01)

(58) Field of Classification Search
CPC ......... B66C 23/53; B66C 23/72; B66C 23/76; B66C 23/80; B66C 23/52; B66C 13/02;
(Continued)

(56) References Cited

U.S. PATENT DOCUMENTS 1,117,917 A * 11/1914 Schoenky ................ B23Q 1/28 212/199
2,293,936 A * 8/1942 Crooke .................... B66D 1/48 212/284

(Continued)

FOREIGN PATENT DOCUMENTS

WO 93/11036 6/1993
WO 00/15489 3/2000

(Continued)

*Primary Examiner* — Gregory W Adams
(74) *Attorney, Agent, or Firm* — Peacock Law P.C.; Janeen Vilven

(57) ABSTRACT

A method and device to balance a tiltable arm comprising a free extremity and having a pivot point on a mounting structure which is supported by a floating object, by providing the arm with suspension and/or support means for controlling the arm's inclination with respect to the horizon, and by providing said suspension and/or support means with at least one spring, wherein the spring connects to the arm and to said mounting structure, and embodying the spring as a passive spring which is arranged to balance the arm so as to stabilize a position of a free extremity of the arm during movements of the floating object.

1 Claim, 10 Drawing Sheets

(51) Int. Cl.
*B63B 27/30* (2006.01)
*B63B 27/14* (2006.01)
*B63B 27/10* (2006.01)
*B63B 17/00* (2006.01)

(58) Field of Classification Search
CPC .................. B66C 13/063; B63B 27/10; B63B 2017/0072
See application file for complete search history.

(56) References Cited

U.S. PATENT DOCUMENTS

| | | | | | |
|---|---|---|---|---|---|
| 2,777,112 | A * | 1/1957 | Coker | G01R 33/04 | 212/261 |
| 3,591,022 | A * | 7/1971 | Polyakov | B66C 13/02 | 212/309 |
| 4,021,019 | A * | 5/1977 | Sanders | B66C 13/02 | 212/308 |
| 4,024,961 | A * | 5/1977 | Stolpe | B25J 9/0081 | 414/729 |
| 4,327,784 | A * | 5/1982 | Denniston | B63B 27/24 | 114/261 |
| 4,674,638 | A * | 6/1987 | Oliphant | F16F 9/16 | 188/380 |
| 4,688,983 | A * | 8/1987 | Lindbom | B25J 9/046 | 414/735 |
| 4,768,762 | A * | 9/1988 | Lund | E05F 1/1075 | 108/136 |
| 4,969,625 | A * | 11/1990 | Singer | B25H 1/0028 | 248/123.2 |
| 6,408,225 | B1 * | 6/2002 | Ortmeier | B25J 19/0012 | 192/58.62 |
| 6,659,703 | B1 * | 12/2003 | Kirkley | B63B 27/10 | 414/138.2 |
| 6,899,308 | B2 * | 5/2005 | Chow | F16F 15/28 | 248/282.1 |
| 8,621,954 | B1 * | 1/2014 | Dellon | 74/490.01 | |
| 9,132,557 | B2 * | 9/2015 | Yamada | B25J 19/0012 | |
| 2005/0193451 | A1 * | 9/2005 | Quistgaard | A61B 5/6843 | 414/1 |
| 2012/0186380 | A1 * | 7/2012 | Yamada | B25J 19/0012 | 74/490.01 |

FOREIGN PATENT DOCUMENTS

| | | |
|---|---|---|
| WO | 2007/120039 | 10/2007 |
| WO | 2011/154730 | 12/2011 |
| WO | 2013/174886 | 11/2013 |
| WO | 2016/089207 | 6/2016 |

* cited by examiner

MOTION COMPENSATION DEVICE

CROSS-REFERENCE TO RELATED APPLICATIONS

This application is a continuation application of Patent Cooperation Treaty Application No. PCT/NL2015/050838, filed on Dec. 3, 2015, which claims priority to Netherlands Patent Application Nos. 2013933 and 2014631, filed Dec. 5, 2014 and Apr. 14, 2015, respectively, and the specifications and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a device suitable for placement in a mounted condition on a floating object, comprising a mounting structure and a tiltable arm having a free extremity and a pivot point supported by said mounting structure, wherein said arm connects to suspension and/or support means for controlling the arm's inclination with respect to the horizon, and wherein said suspension and/or support means comprise at least one spring, wherein opposite extremities of the said spring share connecting points with said arm and with said mounting structure.

Description of Related Art Including Information Disclosed Under 37 C.F.R. §§ 1.97 and 1.98

Such a device is known from WO93/11036 and is for instance used for transfer of personnel or cargo between a fixed or floating installation and a boat in a high sea. According to this document the tiltable arm or boom is pivoted around a horizontal axis of the installation, wherein one outer end of the boom projects over a position to which a boat deck can be maneuvered. An approximately vertical rope or wire connection of approximately constant length is applied between the deck and the outer end of the boom, wherein the outer end of the boom is upwardly suspended around the horizontal axis by means of a passive spring device, thus keeping the rope or wire taut despite the movements of the boat in the waves. The rope or wire connection also serves as a guide rope or guide wire for transport means in the form of a chute like rescue sock, slide, lift, stairway, gangway or the like between the outer end of the boom and the boat deck. The spring device comprises an hydraulic cylinder, wherein claim 3 of WO93/11036 teaches that the spring characteristic can be adjusted by altering the amount of gas and/or liquid in the accumulator with pump and/or valve devices provided for this purpose.

A disadvantage of the known device is that maintaining the arm's free extremity at a predefined position with reference to the boat deck requires the application of said rope or wire which is relatively cumbersome, and which inherently provides an unsafe situation when the rope or wire breaks. In WO93/11036 a passive spring is engaged in an unbalanced configuration, meaning the free extremity of the arm, gangway or access bridge is maintained by the passive spring in only one predetermined inclination of the arm. Once the arm is in any other inclination the passive spring will cause acceleration forces towards the predetermined inclination. When the floating object on which the arm is mounted is subjected to motions due to waves, and when the free extremity of the arm is not connected to a fixed point, these acceleration forces can be very high due to amplification (the acceleration forces due to the spring are amplified by the acceleration forces due to waves). Moreover the acceleration forces are unpredictable and dependent on an irregular wave pattern. This can result in unpredictable and dangerous movements of the free extremity of the arm. In WO93/11036 the passive spring connected to the arm has therefore the drawback of requiring a secondary force to stabilize the free extremity of the arm, such as a connection to a fixed point.

WO2011/154730 discloses a gangway assembly for a vessel comprising a gangway, a pivotably mounted base, a sensor arrangement two sense movement of the vessel, an end portion of the gangway pivotably connected to the base and an actuator connected to the gangway responsive to signals from the sensor arrangement to control the vertical position of an opposite end portion of the gangway so as to compensate for vertical movement of the vessel, and the base arranged to respond to and compensate for roll of the vessel.

WO2013/174886 discloses a gangway system for providing passage between the structure and an independent vessel, comprising a pedestal for mounting to said vessel; a gangway comprising an inboard root hingedly mounted to the pedestal, and an outboard end for interfacing with the structure; a processor and one or more sensors configured to report to the processor and a control system responsive to signals from the processor, wherein a ram is applied responsive to signals from the control system and mounted on the pedestal for adjusting the vertical position of the gangway outboard end; and a ram response to signals from the control system and mounted on the gangway for adjusting the horizontal position of the gangway outboard end.

WO00/15489 discloses a mooring arrangement for mooring a vessel against a structure, comprising a connecting means, a maneuvering member arranged at a first end of the connecting means for adjusting the angle between the connecting means and the horizontal plane, and a locking device arranged at a second end of the connecting means for fastening the vessel to the structure when mooring.

WO2007/120039 discloses the vessel provided with a motion platform and means applied to the platform for compensating motions of the vessel, wherein actuators are applied sensitive to signals from a control system to move the platform with reference to the vessel. Further a passive pressure element is provided to the platform in order to support this platform at least partly.

BRIEF SUMMARY OF THE INVENTION

It is one of the objectives of the invention to arrange that the device according to the preamble is embodied such that a free extremity of the arm can be maintained more easily at a desired position with improved energy efficiency.

It is another object of the invention to maintain the free extremity of the arm at a desired position also when the arm has no connection with a fixed point, and to avoid unpredictable and dangerous movements of the arm, wherein the arm is resistant to irregular and unknown wave patterns.

Another objective is to provide that the device is operationally safe at all circumstances; meaning that with a power failure the construction with the tiltable arm remains essentially balanced.

A still further objective is to provide that the device has improved handling capability for heavier weights and/or longer arms.

Further objectives and advantages of the invention will become apparent from the following disclosure.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1A:
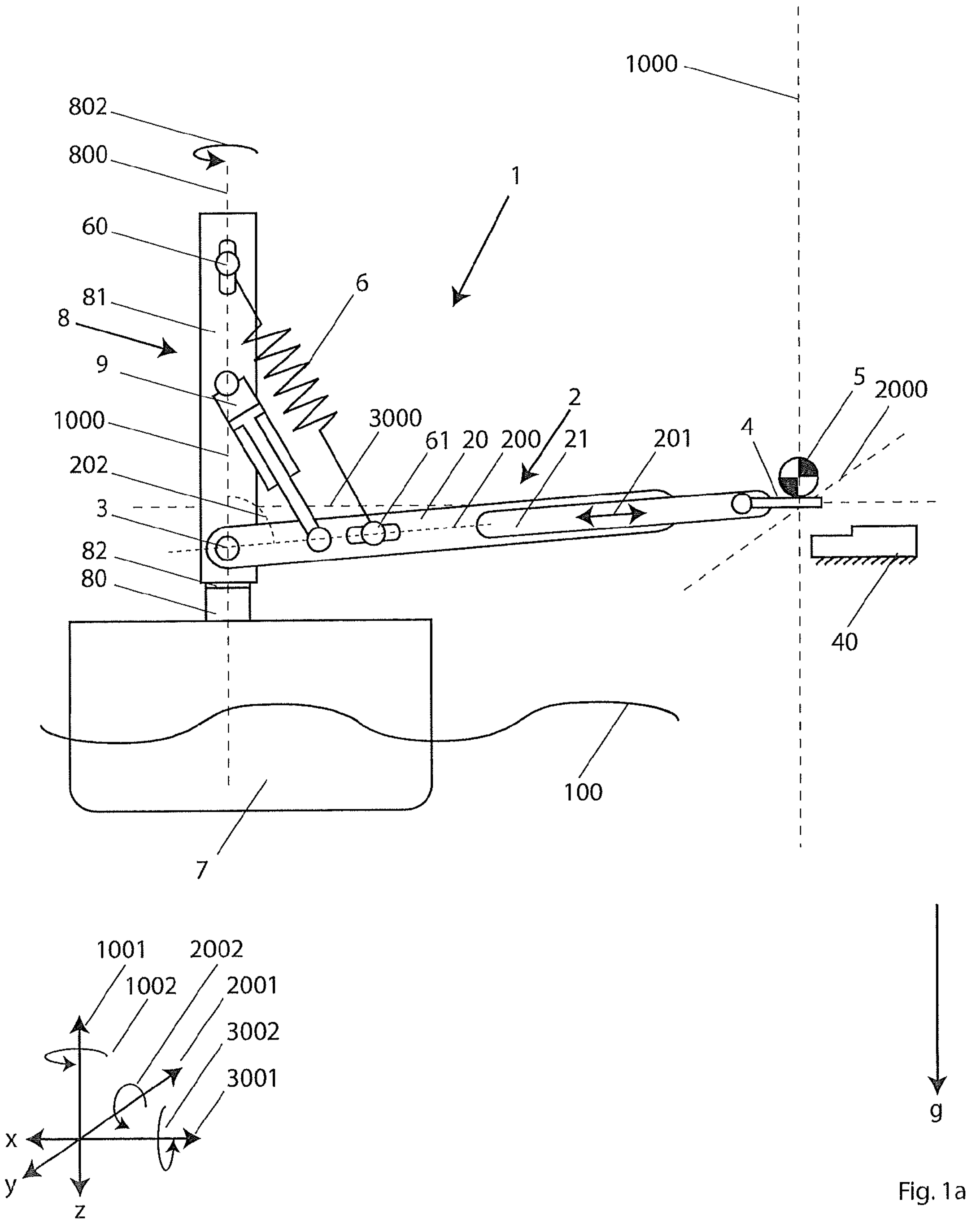
FIG. 1*a* shows a schematic side view of a first embodiment of a device according to the invention.

The invention is embodied in a device and a method to balance a tiltable arm comprising a free extremity and having a pivot point on a mounting structure which is supported by a floating object, in accordance with one or more of the appended claims.

In a first aspect of the invention the device is embodied with the feature that the spring is a passive spring and is arranged to balance the arm so as to substantially stabilize a position of a free extremity of the arm during movements of the floating object. A major advantage of this is that hardly any energy will be required for maintaining the free extremity of the arm at the desired position or orientation. Preferably then the free extremity of the arm distant from the mounting structure is arranged to carry or support a payload, wherein the spring is arranged to balance the arm including said payload.

Without being bound to any particular theory the inventors contemplate that in the invention the moment generated by the force of gravity on the arm relative to the pivot point with the mounting structure is to be substantially compensated by a moment generated on the arm relative to said pivot point by the spring in any inclination the arm assumes, so that the spring is arranged to balance the arm in any inclination it assumes, meaning that the force of gravity on the arm and the force of the spring on the arm cancel each other out and do not change or influence the position of the free extremity of the arm. In that situation it is the inertia of the arm which ensures maintaining the position of the free extremity of the arm during movements of the floating object due to waves at any wave frequency and in high sea states.

Suitably the spring is a gas spring comprising a gas container or a hydro-pneumatic spring comprising a gas container and an oil container. The inventors have found that particularly this type of spring is best equipped to balance heavy loads without much energy consumption, if any at all.

Without excluding any other possible embodiments it is in a particular embodiment preferable that with the mounting structure being level, the said pivot point of the tiltable arm with the mounting structure and the connecting point of the at least one spring with the mounting structure are positioned on a straight imaginary vertical line above each other. This construction is particularly suitable for marine applications wherein it is possible to stabilize the position of the free extremity of the arm with a very little amount of energy (if any at all), and this applies to heave, and pitch or roll depending on the arm's direction with reference to the object on which it is mounted.

In order to enable the device to adequately compensate all possible motions due to the waves at least a part of the mounting structure carrying the tiltable arm is rotatable with reference to the object.

It is advantageous that at least one of the connecting points of the spring with the arm and with the mounting structure is adjustable in position along the arm respectively the mounting structure, and/or a spring constant of said spring is adjustable. In this way it is easily possible to compensate for different loads to which the arm is subjected, and for compensating imbalance due to extensions or reductions in length of the arm.

It is preferable that the device comprises at least a first positioning actuator for the arm in addition to the adjustable spring. The position of the free extremity of the arm can then easily be adjusted and relatively small forces due to motion of the object or frictional forces can be compensated.

Further to optimize the reach of the device of the invention it is preferable that the arm is articulated.

In one preferred embodiment of the device of the invention the arm has at least two parts that are displaceable with reference to each other. Advantageously the at least two parts of the arm are longitudinally displaceable with reference to each other and/or said at least two parts of the arm are angularly displaceable with reference to each other. Suitably the at least two parts of the arm are angularly displaceable with reference to each other in a substantially horizontal plane and/or in a substantially vertical plane. These features contribute to securing the reach of the arm and enabling that the arm's extremity is controllable as to its position.

In all embodiments it is preferred that the at least two parts of the arm are arranged to be displaced with reference to each other so as to maintain the free extremity of the arm which lies distant from the mounting structure, at a predetermined and possibly variable position and/or orientation.

Further it is preferable that the mounting structure is arranged to be pivotably mountable or placeable on the object.

Appropriately in the mounted condition the mounting structure is mounted and connected with at least one hinge to the object. This optimizes the maneuverability of the mounting structure with reference to the object and increases its capability to counter motions due to the waves.

In one suitable embodiment the mounting structure is provided with a gimbal for mounting and connecting it to the object.

Further it may be beneficial that in the mounted condition the device is provided with at least a second actuator for pivoting the mounting structure with reference to the object.

Suitably further the device is provided with at least one sensor for monitoring an orientation of the free extremity of the arm distant from the mounting structure and/or of the mounting structure, wherein the device is further provided with a control system receiving signals from said at least one sensor, which control system based on said signals drivingly connects to the said first positioning actuator for the arm to maintain its free extremity at a predetermined position and/or orientation.

It is further beneficial that in the mounted condition the at least one sensor is equipped for monitoring an orientation of the floating object, and that the control system receives signals relating to the orientation of the floating object, which control system based on said signals drivingly connects to the said first positioning actuator for the arm to maintain its free extremity at a predetermined position and/or orientation.

It is further preferred that the control system drivingly connects to means for positioning at least one of the connecting points of the spring with the arm and with the mounting structure respectively and/or for adjusting a spring constant of said spring to maintain the free extremity of the arm at a predetermined position and/or orientation.

It may still be further beneficial that the control system drivingly connects to means for displacing the at least two parts of the arm with reference to each other so as to maintain the free extremity of the arm distant from the mounting structure at a predetermined position and/or orientation.

The adequacy of the device of the invention may be further promoted in that the control system drivingly connects to the second actuator for pivoting the mounting structure with reference to the object to maintain the free extremity of the arm at a predetermined position and/or orientation.

Even further it may be beneficial that in the mounted condition the control system drivingly connects to means for extending the mounting structure upwards with reference to the object to maintain the free extremity of the arm at a predetermined position and/or orientation.

Still further it may be beneficial that in the mounted condition the control system drivingly connects to means for rotating the mounting structure with reference to the object to maintain the free extremity of the arm at a predetermined position and/or orientation.

The invention will hereinafter be further elucidated with reference to the drawing of exemplary embodiments of a device according to the invention that is not limiting as to the appended claims.

Whenever in the figures the same reference numerals are applied, these numerals refer to the same parts.

Making first reference to FIG. 1*a*, a first embodiment of the device 1 according to the invention is shown.

A floating object 7 is subjected to the motions of waves 100. In practice, the floating object 7 is mostly a ship, a vessel or a working platform. Drawn in FIG. 1*a* is a cross section of the hull of a ship 7, the ship's bow and stern are not drawn and extend from the shown cross section parallel to the y-axis 2000.

Due to waves 100, the floating object 7 is subjected to motions of:

heave 1001, a motion parallel to the vertical axis 1000, yaw 1002, a rolling motion revolving around the vertical axis 1000, surge 2001, a motion parallel to the y-axis 2000, roll 2002, a rolling motion revolving around the y-axis 2000, sway 3001, a motion parallel to the x-axis 3000, pitch 3002 a rolling motion revolving around the x-axis 3000.

The arm 2 is mounted on the floating object 7 by a mounting structure 8 in a pivot point 3. The upper part of the mounting structure 81 may be enabled to make a rotating movement 802 revolving around the spring base 80 in the swivel point 82 of the mounting structure 8. The upper part of the mounting structure 81 may slide along the mounting base 80 in the direction of the mounting structure 8 in order to extend the mounting structure 8 in a direction 800 of the mounting structure 8 in order to increase the working height of the arm 2. In this figure the direction of the vertical axis 1000 is parallel to the direction 800 of the mounting structure 8.

Figure 2A:
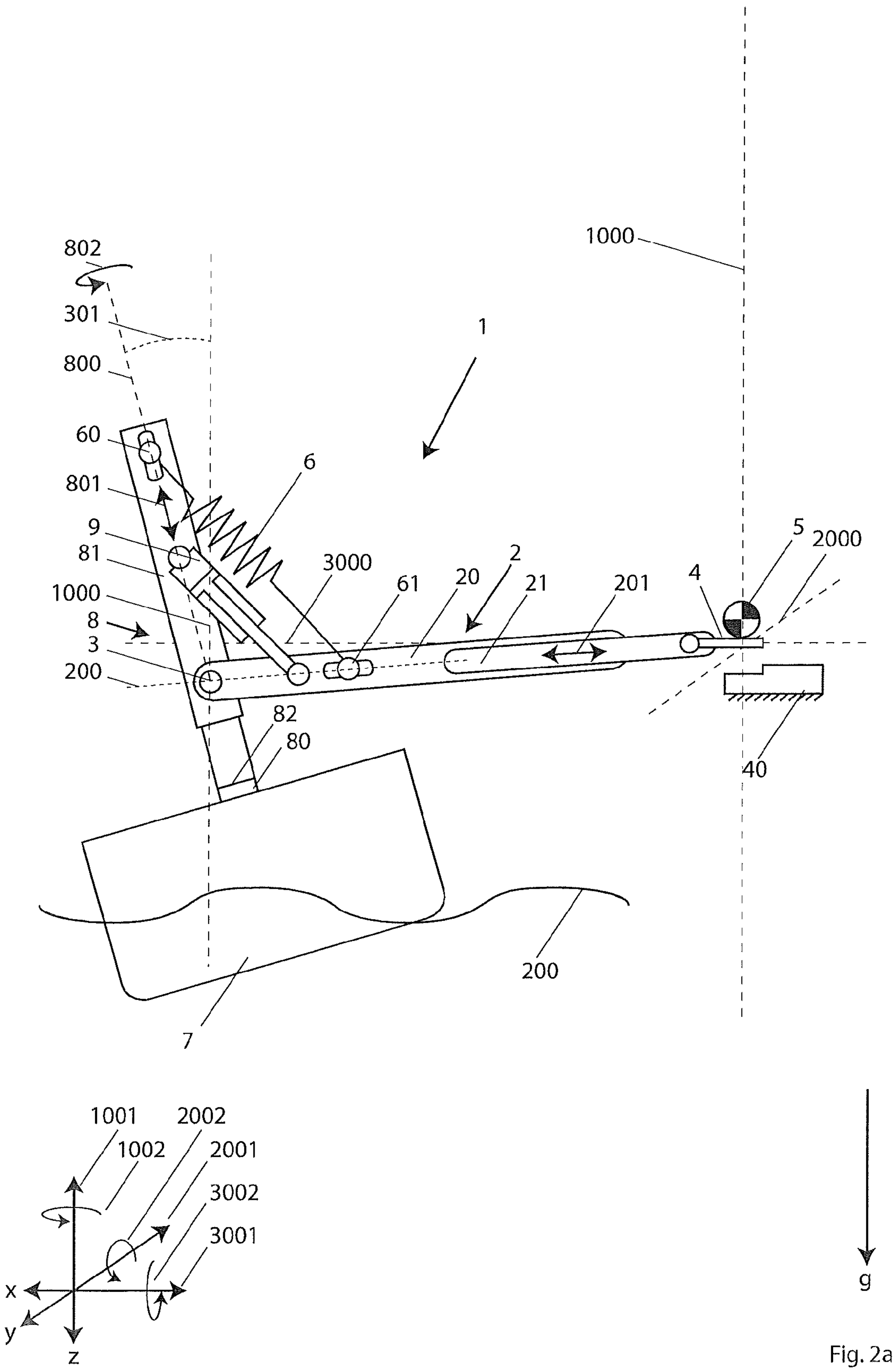
FIG. 2*a* shows a schematic side view of a fourth embodiment according to the invention.
Figure 2B:
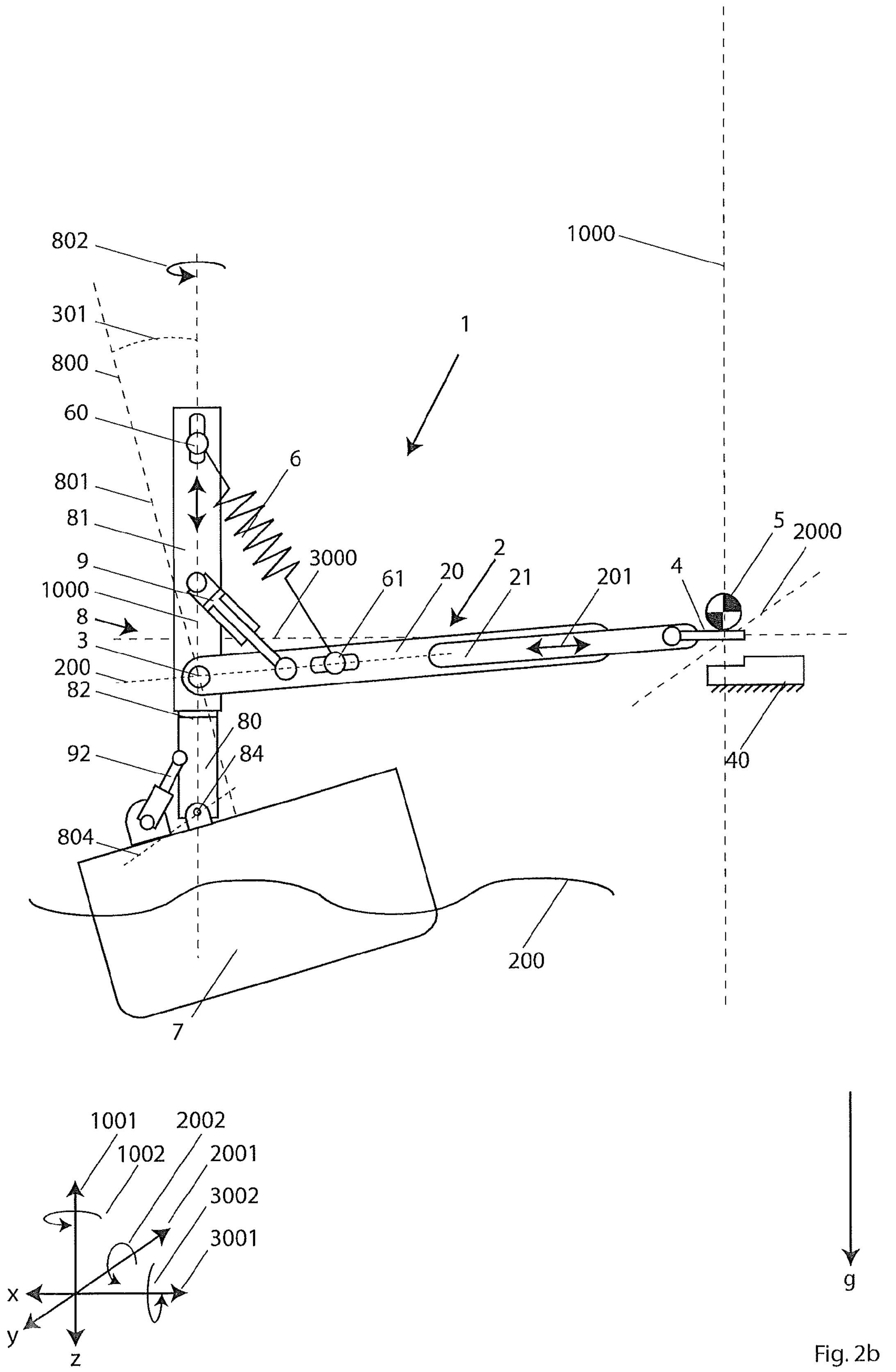
FIG. 2*b* shows a schematic side view of a fifth embodiment according to the invention.

The arm 2 is further connected to the mounting structure 8 by a spring 6 in a spring base point 60 located on the mounting structure 8 and a spring mounting point 61 located on the arm 2. When the floating object 7 is level, the spring base point 60 (the connection point of the spring 6 with the mounting structure 8) and the pivot point 3 are positioned on a straight imaginary vertical line 800 above each other. The spring base point 60 may be movable along the mounting structure 8, the spring mounting point 61 may be movable along the arm 2. The spring 6 may be a conventional coil spring, but in practice, as depicted in FIG. 2*e* and further, in most offshore conditions the spring will likely be a hydro-pneumatic spring comprising a spring piston 66 connected to a gas container 62. The spring 6 may also comprise multiple spring pistons 66 and/or gas containers 62.

The arm's free extremity 4 may be constructed to transfer a payload 5 (cargo or staff) between the floating object 7 and a connection point 40 or vice versa. The connection point 40 may be located on a fixed object as shown in this FIG. 1*a*, but the connection point 40 may possibly also be located on another floating object.

The arm 2 comprises at least one arm segment 20 but may also be articulated, comprising a second arm segment 21 or even multiple arm segments. In this FIG. 1*a* the second arm segment 21 extends from the first arm segment 20 in a sliding or rolling way, but the arm segments may also be connected to each other with a pivot point or by other moving means. The arm parts may be longitudinally and/or angularly displaceable with reference to each other. The relative position of the arm segments to each other will determine the length of the arm 2. The arm segments may slide or pivot against each other by conventional actuation means, extending or retracting the arm 2.

The arm 2 may further be connected to the mounting structure 8 by a positioning actuator 9. The positioning actuator 9 is depicted in this FIG. 1*a* being connected to the mounting structure 8 on the same imaginary vertical line 800 as the spring base point 60 and the pivot point 3, but in practice the positioning actuator 9 does not need to be connected to the mounting structure 8 on this imaginary vertical line 800.

Figure 2C:
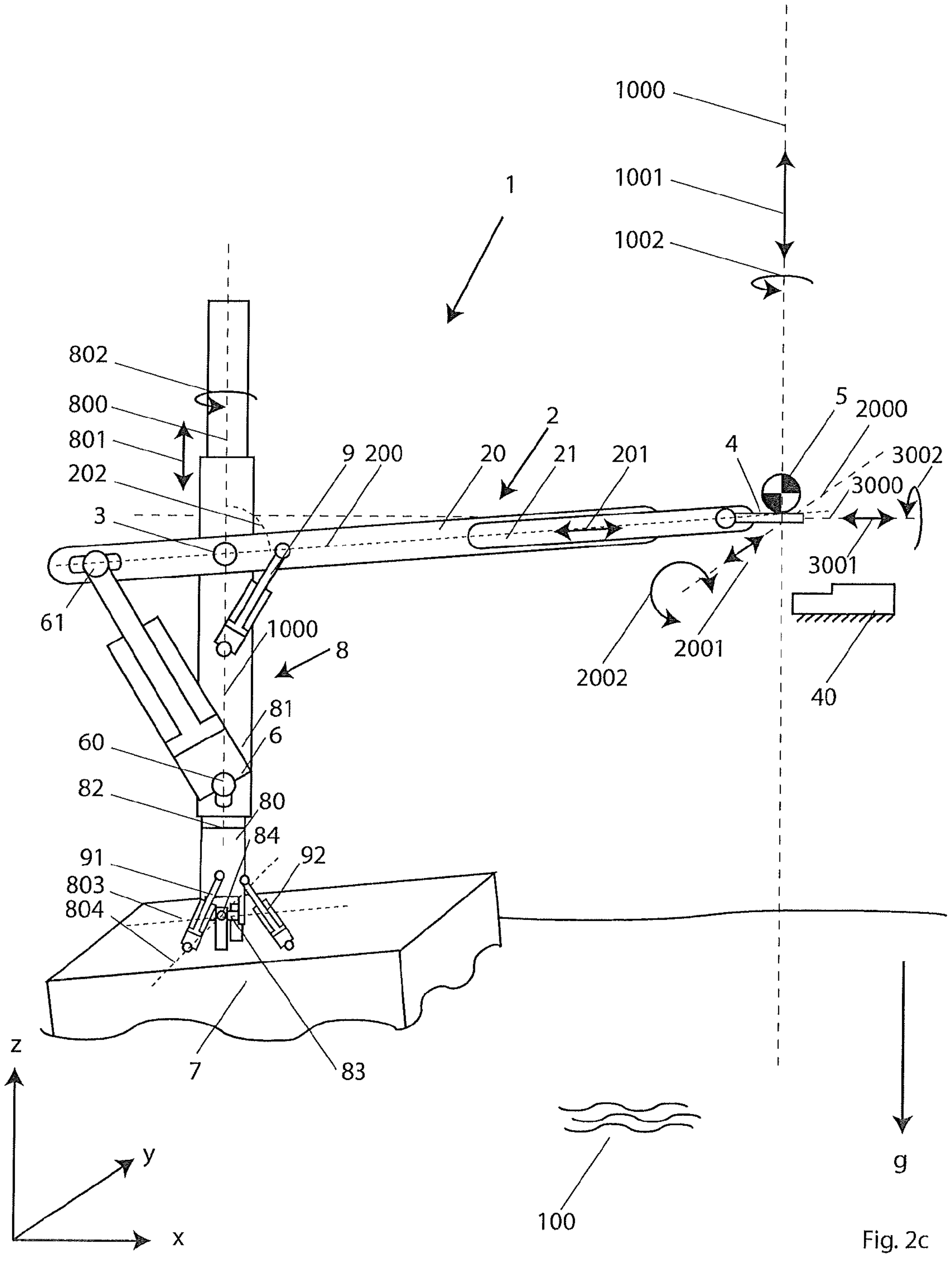
FIG. 2*c* shows a schematic side view of a sixth embodiment according to the invention.

In practice the positioning actuator 9 and/or the spring 6 may also be connected to the mounting structure 8 below the pivot point 3 as depicted in FIG. 2*c* and further.

The arm 2 extends in a direction 200, and an inclination angle 202 is defined between the direction 200 and the vertical axis 1000. In this FIG. 1*a* the direction 200 of the arm 2 is square to the axis 2000 but in practice the direction 200 of the arm 2 may be square to the axis 3000 or at any direction in between.

Changing the length of the arm 2 and/or a change in the force payload 5 exerted on the arm 2 may be counteracted by the positioning actuator 9 and/or by adjusting the spring. The spring may be adjusted by moving one of the spring connection points 60, 61 or both, and/or by changing the spring constant of the spring 6.

The payload 5 is shown as carried on the free extremity 4 but may also be suspended underneath the free extremity 4 by means of a rope or wire, or by means of a hoisting system with pulleys or other conventional hoisting means. The payload 5 may also be connected to any other part of the arm 2 and may be moved along the arm 2 and connected or disconnected at any time.

In use, while the pivot point 3 is subjected to heave 1001, the position of the free extremity 4 along the vertical 1000 axis is maintained stationary substantially by the spring 6. The pivot point 3 will repetitively move up and down due to the waves 100, but the spring 6 will maintain the vertical position of the free extremity 4 stationary along the vertical axis 1000, accumulating and releasing the energy for the continuous changes of the inclination 202 of the arm 2. Due to the configuration of the spring 6 it generates a moment in the pivot point 3 counteracting the forces of gravity on the arm 2 and—when applicable—its payload 5, in any inclination 202 of the arm 2. Therefore, the energy required to maintain the position of the free extremity 4 along the vertical axis 1000 stationary during heave 1001 is delivered substantially by the spring 6.

In use, because of the action of the spring 6, a positioning actuator 9 is not substantially required to maintain the position of the free extremity 4 along the vertical axis 1000 stationary during the influence of heave 1001. Therefore the device 1 is energy efficient and enables safe operation: maintaining the free extremity 4 substantially stationary along the vertical axis 1000 is not dependent on the continuous supply of energy nor depending on a functional actuation system. However, the positioning actuator 9 may be engaged for relatively small forces required to maintain the free extremity 4 stationary along the vertical axis 1000, such as counteracting friction in the spring 6. In addition the positioning actuator 9 may be engaged to change the inclination 202 of the arm 2 in order to change the position of the free extremity 4 along the vertical axis 1000.

In use, during the influence of motions due to waves 100 as mentioned above, the relative position of the free extremity 4 to the connection point 40 may further be maintained stationary by adjusting the length 201 of the arm 2 and changing the orientation of the mounting structure 8 relative to the floating object 7.

In use, when the length of the arm 2 changes and/or when the influence of the payload 5 on the arm 2 changes, the spring 6 may be adjusted in order to balance the arm 2. This can be done by changing the position of at least one of the spring connecting points 60, 61 and/or by changing the spring constant of the spring 6.

Figure 1B:
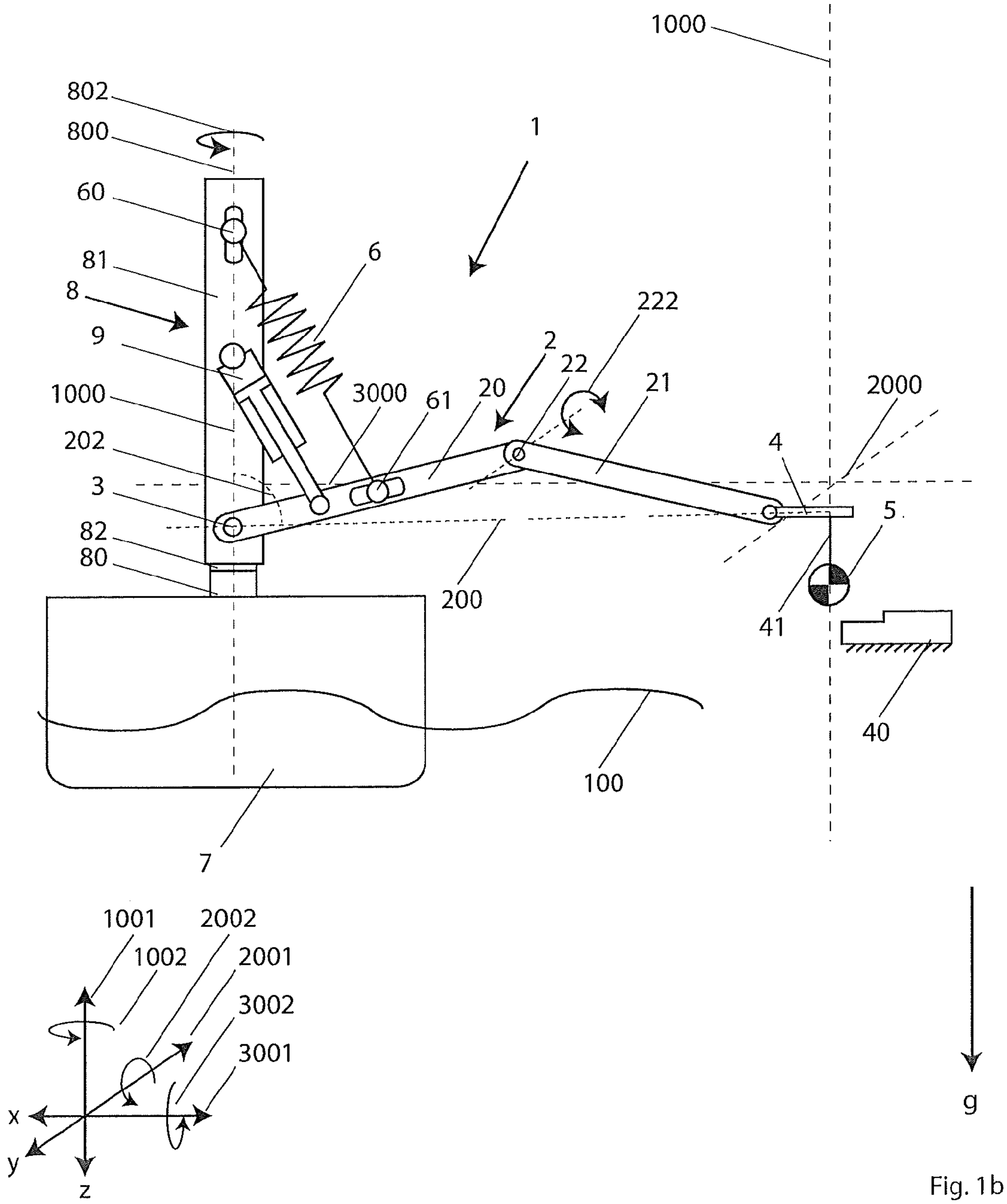
FIG. 1*b* shows a schematic side view of a second embodiment according to the invention.

Making reference now to FIG. 1*b*, a second embodiment of the device 1 according to the invention is shown.

The arm 2 shown in FIG. 1*b* comprises a first arm segment 20 which is pivotably connected to the second arm segment 21 in a pivot point 22 with an axis substantially parallel to the horizontal axis 2000. The second arm segment 21 is enabled to make a pivoting movement 222 parallel to the horizontal axis 2000, extending or retracting the second arm segment 21 to or from the first arm segment 20. The two arm parts 20 and 21 are angularly displaceable with reference to each other in a horizontal plane. The payload 5 is suspended under the free extremity 4 of the arm 2 by means of a rope or wire 41 and may in practice be suspended by means of a hoisting system with pulleys or other conventional hoisting means.

Figure 1C:
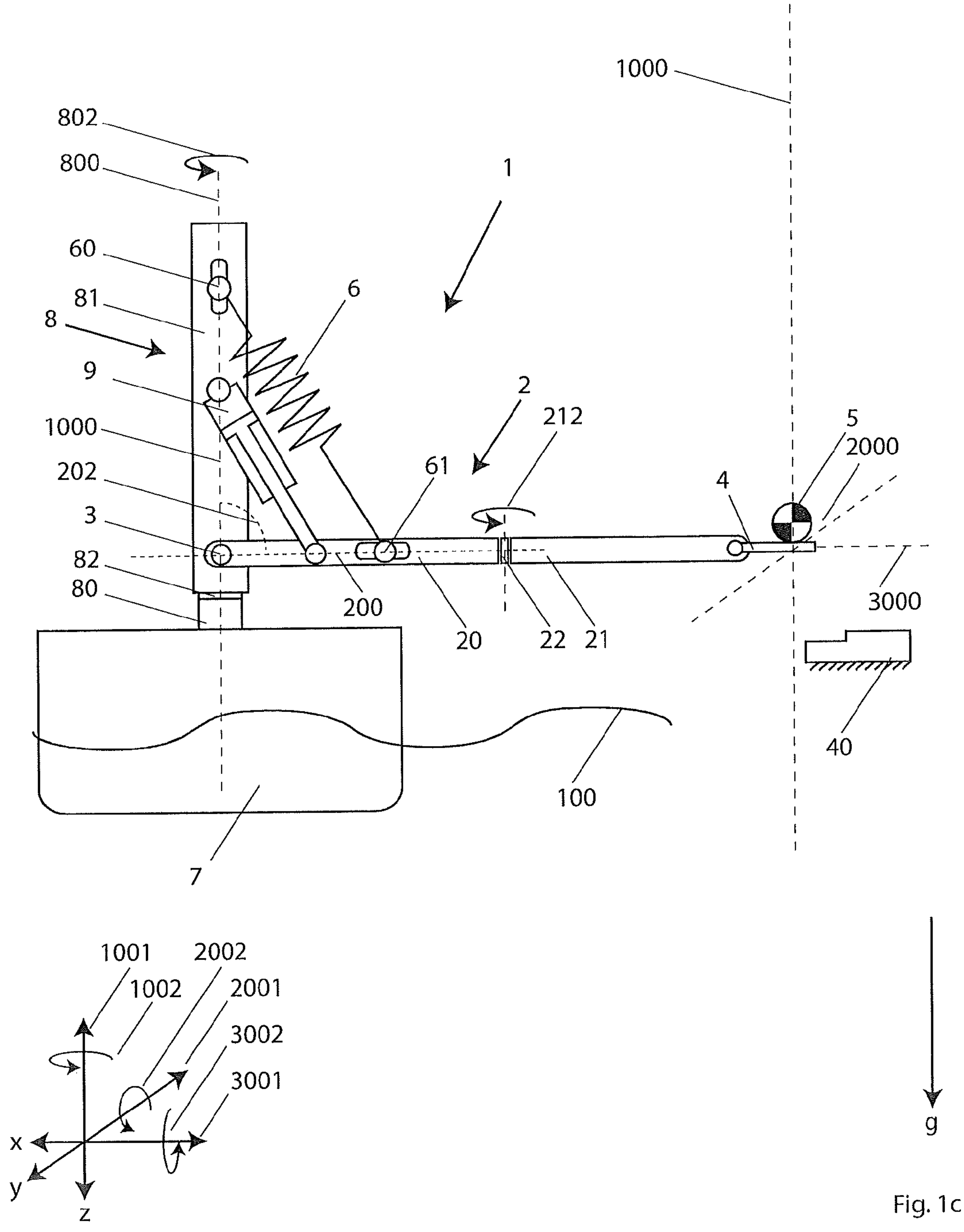
FIG. 1*c* shows a schematic side view of a third embodiment according to the invention.

With reference to FIG. 1*c* a third embodiment of the device 1 according to the invention is shown.

The arm 2 of the device shown in FIG. 1*c* comprises a first arm segment 20 which is pivotably connected to the second arm segment 21 in a pivot point 22 which is aligned substantially parallel to the vertical axis 1000. The second arm segment 21 is enabled to make a pivoting movement 212 parallel to the vertical axis 1000, extending or retracting the second arm segment 21 to or from the first arm segment 20. The two arm parts 20 and 21 are angularly displaceable with reference to each other in a vertical plane.

With reference to FIG. 2*a* a fourth embodiment of the device 1 according to the invention is shown.

Due to a rolling motion 2002 (called roll for this direction of the floating object 7), the mounting structure 8 of the device shown in FIG. 2*a* extends in a direction 800, causing an offset angle 301 with the vertical axis 1000. Due to the offset angle 301 the spring 6 causes acceleration forces on the arm 2 and—when applicable—its payload 5. These acceleration forces can be counteracted by the positioning actuator 9.

With reference to FIG. 2*b* a fifth embodiment of the device 1 according to the invention is shown.

In FIG. 2*b* the mounting structure 8 is pivotably mounted on the floating object 7 with a hinge 84 and further connected to the floating object 7 with an offset actuator 92.

In use, during a rolling motion 2002 of the floating object 7, the mounting structure 8 is maintained substantially vertical by the offset actuator 92. By doing so the positioning actuator 9 does not need to counteract acceleration forces due to an offset angle, despite the rolling motion of the floating object 7. The orientation 804 of the hinge 84 is square to the horizontal orientation of the arm 2. This is not a preferred solution because in this configuration, for compensation of the offset angle 301 the offset actuator 92 uses a lot of energy. This is because the moment the arm 2 generates in the hinge 84 needs to be considered. It is preferable to maintain the direction of the orientation of the hinge parallel to the horizontal orientation of the arm 2. Then the offset angle 301 can be compensated with little energy because the moment generated by the arm 2 in the pivot point does not need to be taken in consideration.

Making now reference to FIG. 2*c*, a sixth embodiment of the device 1 according to the invention is shown. In FIG. 2*c* the spring 6 is a gas spring comprising a gas container 62 and the piston 66. Mounting structure 8 is mounted on the floating object 7 by two hinges 83 and 84 (a gimbal). The mounting structure 8 is extendable and retractable by a motion 801 of the upper part of the mounting structure 81 along the mounting base 80. Depending on practical requirements the positioning actuator 9 may be placed above of underneath the arm 2. In the shown embodiment the spring 6 and the positioning actuator 9 are mounted below the arm. In order to balance the arm 2 when the spring 6 is positioned underneath the arm 2, the connection point 61 is connected to the arm 2 at a side of the arm beyond the pivot point 3 with reference to the payload 5. By using simple construction principles, in practice the spring connection point 61 can be constructed at any desired position, as long as the spring connection point 60 is re-positioned correspondingly.

In use, the floating object 7 is subjected to a rolling motion 2002 (roll) and to a rolling motion 2003 (pitch), and the mounting structure 8 is maintained substantially vertical by two offset actuators 91 and 92. In order to change the working position of the arm, the upper part of the mounting structure 81 may be extended or retracted from the mounting base 80.

Figure 2D:
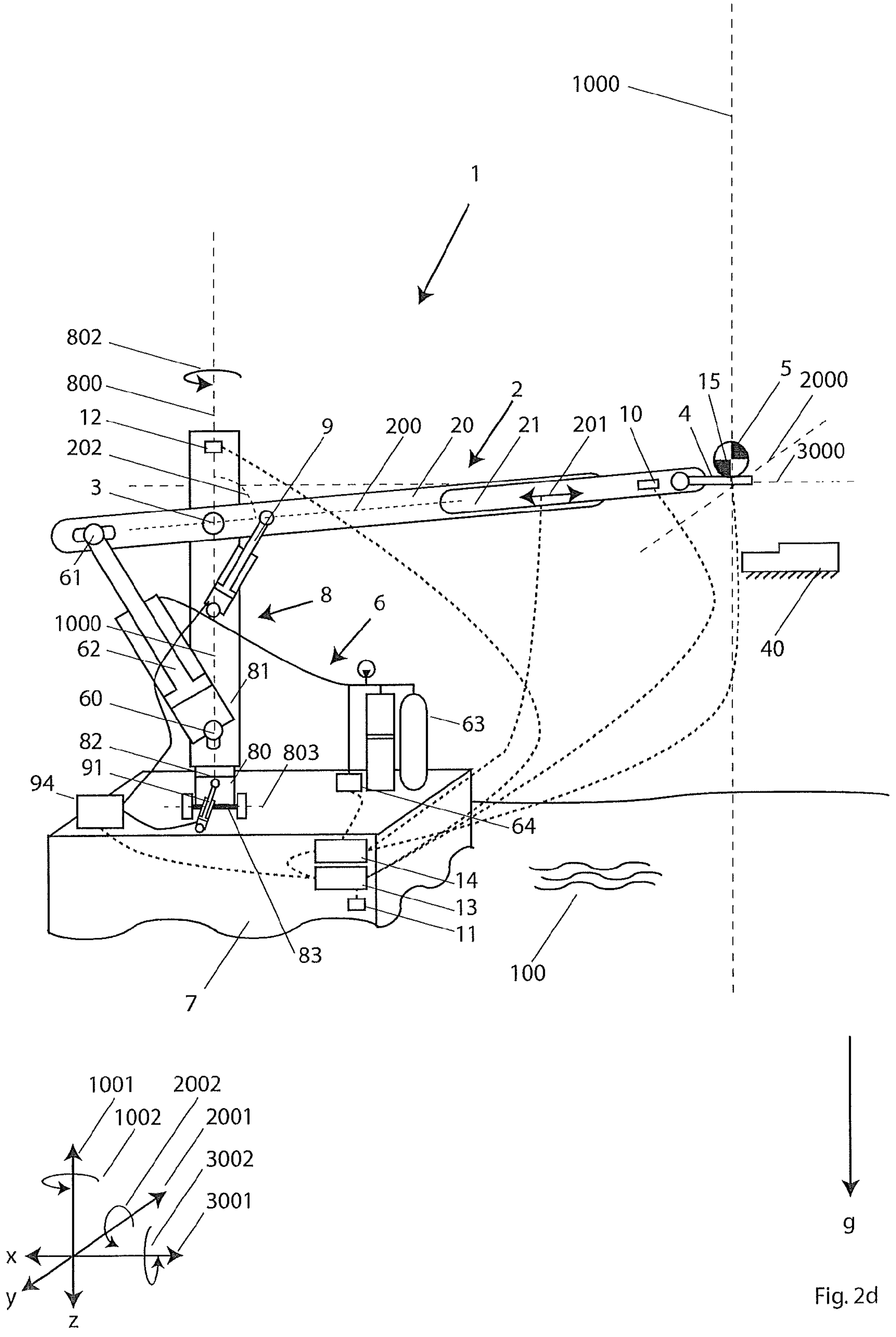
FIG. 2*d* shows a schematic side view of a seventh embodiment according to the invention.
Figure 2E:
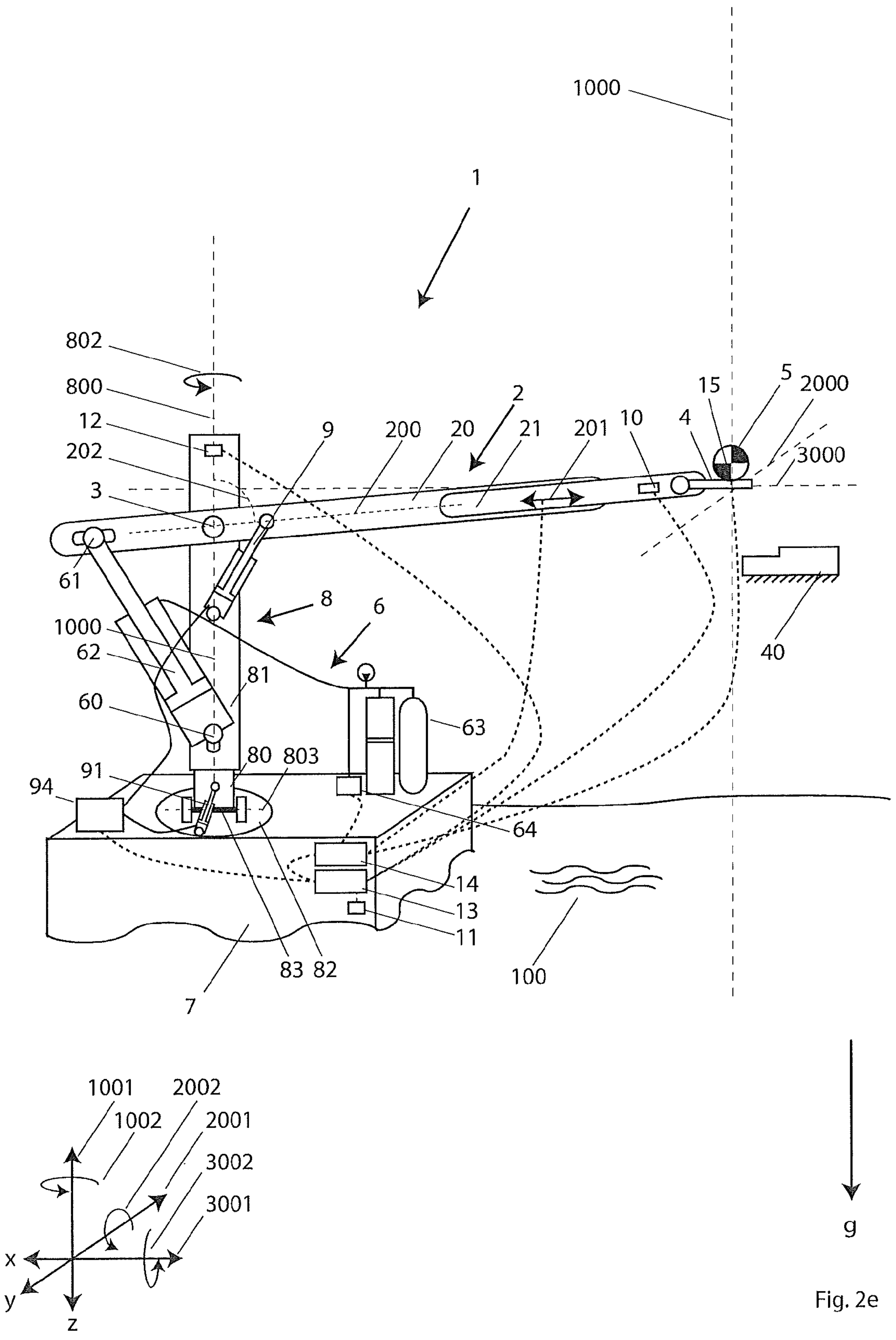
FIG. 2*e* shows a schematic side view of an eighth embodiment according to the invention.

With further reference to FIG. 2*d* a seventh embodiment of the device 1 according to the invention is shown.

In FIG. 2*d* the spring 6 is a hydro-pneumatic spring, comprising a gas container 62 and an oil container 63 separated by a membrane, bladder or piston. In practice the hydro-pneumatic adjustable spring 6 may comprise multiple gas container 62 and/or multiple pistons 66. The spring 6 may be further be equipped with a hydraulic pump 64 answers or a gas compressor 65 in order to control the spring constant of the spring 6. The spring 6 may be controlled by a control system 14, which may receive input from a load cell sensor 15 measuring the weight of the payload 5 and another sensor measuring the length of the arm 2. The positioning actuator 9 is connected to a hydraulic motor 94, which in practice may be equipped with a hydraulic accumulator, and which motor 94 is controlled by a control system 13 which receives input from at least one motion sensor 10 but possibly from more motion sensors 11, 12. The control system 13 and the motor 94 may also drive the offset actuator 91 rotating the mounting structure 8 around the offset axis 83 preferably parallel to the horizontal orientation 200 of the arm 2.

In use, when the length of the arm 2 changes and/or the influence of the payload 5 on the arm 2 changes, the spring constant of the spring 6 may be adjusted in order to balance the arm 2 and—when applicable—its payload 5. This may be done by changing the position of at least one of the spring connection points 60, 61 and/or by changing the spring constant of the spring 6 by adjusting the gas volume and/or the oil volume in the hydro-pneumatic spring.

Turning now to FIG. 2*e* an eighth embodiment of the device 1 according to the invention is shown.

In this preferred embodiment of FIG. 2*e*, the whole mounting structure 8, including the hinge 83 with its offset actuator 91 is mounted above mount swivel point 82. Therefore, in any horizontal orientation of the arm 2, offset axis 803 always extends aligned with the horizontal orientation of the arm 2. The offset angle which is most easy to compensate (aligned with the horizontal orientation of the arm 2) is therefore always compensated by the offset actuator 91. The adjustable spring 6 compensates for both heave 1001 and substantially for the offset angle square to the horizontal orientation of the arm 2. As its relative size suggests, the forces delivered by the spring cylinder 62 are larger than the forces delivered by the positioning actuator 9. In this configuration, the device 1 enables safe and energy efficient compensation for heave 1001, pitch and roll (2002, 3002 or vice versa) as well as for the other motions due to waves 100 mentioned above.

Figure 3:
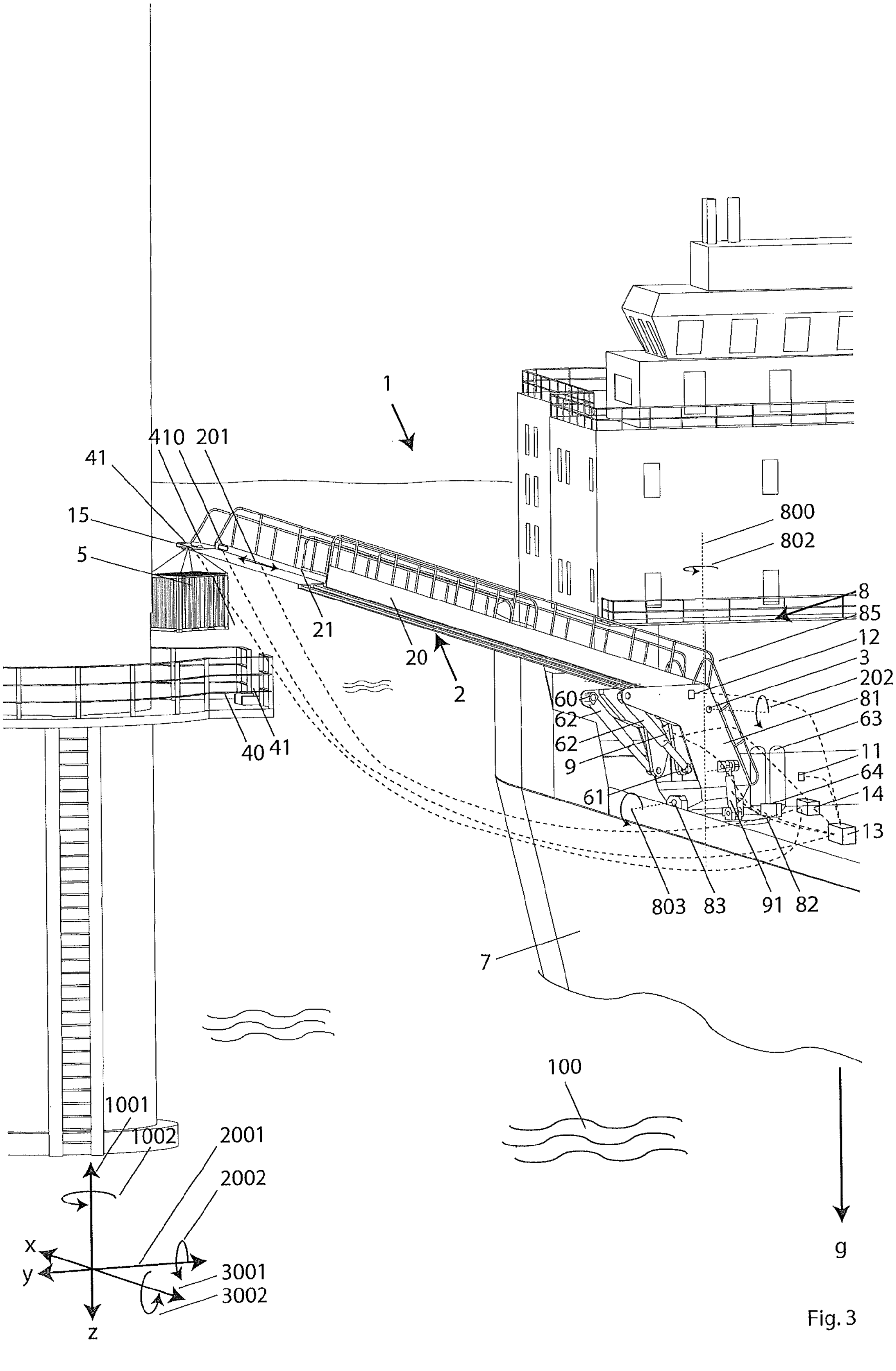
FIG. 3 shows a 3-dimensional view of a ninth embodiment according to the invention.

In FIG. 3 a ninth embodiment of the device 1 according to the invention is shown. FIG. 3 provides a 3 dimensional view of a preferred realization of the device 1 depicted schematically in FIG. 2*e*.

The arm 2 of the device shown in FIG. 3 is both suitable for transferring staff and also for transferring heavier payloads 5 such as cargo.

It can be seen that the arm can be accessed by staff or cargo from the deck of a boat 3 during operation of the arm in all angles of the arm and in any horizontal orientation of the arm by simple access means such as a stair 85. The swivel point 82 is below the hinge 83 and its offset actuator 91.

Due to the energy efficient compensation in the device of the invention for heave, pitch and roll (and all other motions due to waves 100 mentioned above), the power supplies 94 and 64 as shown on the deck of the floating object 7 are much smaller compared to the power supplies of known devices. The first arm segment 20, the free extremity 4 and the connection point 40 both comprise guide and connect means 41. The first arm segment 20 is supported by a hydro-pneumatic spring 6 comprising two spring piston 66 and two gas containers 62.

Figure 4:
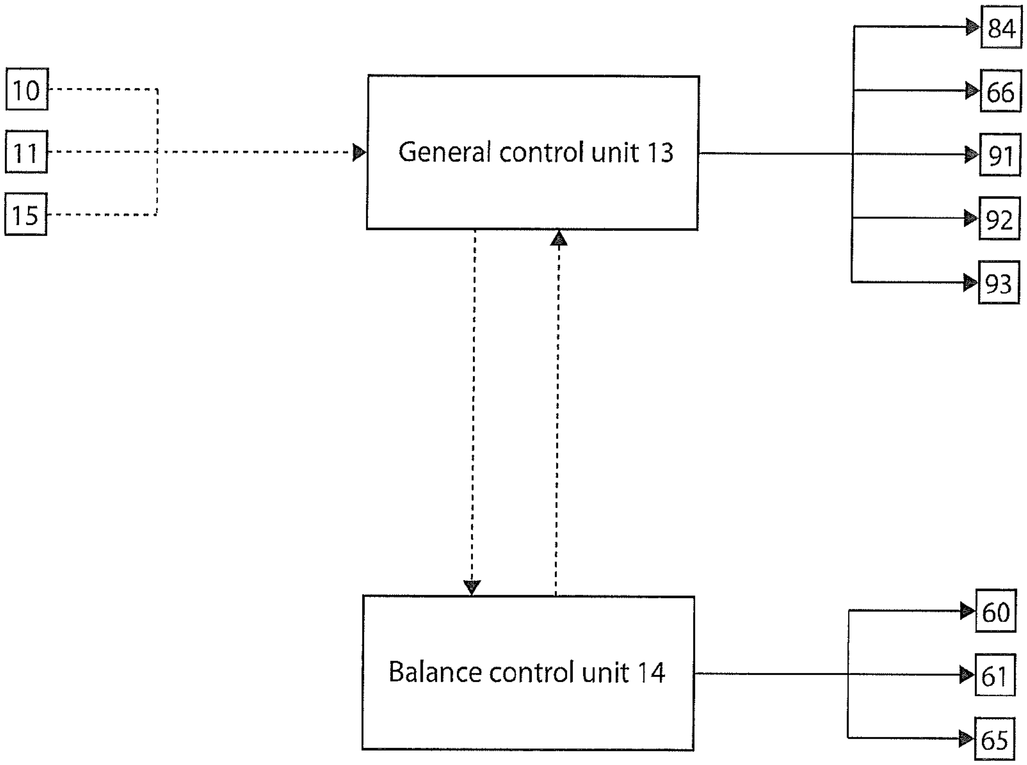
FIG. 4 schematically shows the arrangement of the control system and the connected sensors and actuators forming part of the device of the invention.

FIG. 4 finally shows the basic schematics of the control system and sensors and actuators that are part of the device of the invention. The control system 13, 14 receives data about the status of the device from different sensors. FIG. 5 shows for instance motion sensor 10, motion sensor 11 and load cell sensor 15 that are shown in FIG. 2*d*. Another sensor that is used but is not shown relates to the actual length of the tiltable arm counting from its pivot point 3 up to where the payload 5 is supported, and the weight of which is measured with the load cell sensor 15. It is further shown that the control system 13, 14 drivingly connects to means for positioning at least one of the connecting points 60, 61 (see for instance FIG. 2*d*) of the spring 6 with the arm 2 and with the mounting structure 8 respectively and/or for adjusting a spring constant 65 of said spring 6. Further the control system 13, 14 preferably drivingly connects to means 66 which are equipped to displace the at least two parts 20, 21 of the arm 2 (see for instance FIG. 2*e*) with reference to each other. The control system 13, 14 preferably also drivingly connects to the second actuator 91, 92 (see FIG. 2*c*) which is equipped for pivoting the mounting structure 8 with reference to the object 7. Further the control system 13, 14 preferably drivingly connects to means 83 for extending the mounting structure 8 upwards with reference to the object 7, and said control system 13, 14 preferably drivingly connects to means 84 for rotating the mounting structure 8 with reference to the object 7.

Although the invention has been discussed in the foregoing with reference to several exemplary embodiments of the device of the invention, the invention is not restricted to these particular embodiments which can be varied in many ways without departing from the gist of the invention. The discussed exemplary embodiments shall therefore not be used to construe the appended claims strictly in accordance therewith. On the contrary the embodiments are merely intended to explain the wording of the appended claims without intent to limit the claims to the offered exemplary embodiments. The scope of protection of the invention shall therefore be construed in accordance with the appended claims only, wherein a possible ambiguity in the wording of the claims shall be resolved using the provided examples.

What is claimed is:

1. A device placed in a mounted condition on a floating object comprising:

a mounting structure and a tiltable arm having a free extremity and a pivot point supported by said mounting structure, wherein said arm connects to suspension and/or support means for controlling the arm's inclination with respect to the horizon, said suspension and/or support means comprise at least one spring, wherein opposite extremities of the said spring share connecting points with said arm and with said mounting structure, wherein the spring is a passive spring and is arranged to balance the arm so as to stabilize a position of a free extremity of the arm during movements of the floating object in that a moment generated by the force of gravity on the arm relative to the pivot point with the mounting structure is substantially compensated by a moment generated on the arm relative to said pivot point by the spring in any inclination the arm assumes and the device further includes at least a first positioning actuator for the arm in addition to the spring, so that the spring is arranged to balance the arm in any inclination it assumes, and the force of gravity on the arm and the force of the spring on the arm cancel each other out to arrange that the position of the free extremity of the arm is substantially independent from said forces to cause an inertia of the arm that ensures maintaining the said extremity of the arm in a stable position during movements of the floating object, wherein the free extremity of the arm distant from the mounting structure is arranged to carry or support a payload and wherein the spring is arranged to balance the arm including said payload and wherein at least one of the connecting points of the spring with the arm and with the mounting structure is adjustable in position along the arm respectively the mounting structure, and/or a spring constant of said spring is adjustable.

* * * * *